United States Patent
Owens et al.

[11] Patent Number: 6,047,267
[45] Date of Patent: Apr. 4, 2000

[54] METHOD AND APPARATUS FOR TRACKING MULTIPLE PAYMENT RESOURCES AND CHARGING TRANSACTIONS TO PAYMENT RESOURCES IN ON LINE TRANSACTION PROCESSING SYSTEM

[75] Inventors: Gary L. Owens, Mountain View; David S. Labuda, Half Moon Bay; James R. Haddock, Santa Clara, all of Calif.

[73] Assignee: Portal Software, Inc., Cupertino, Calif.

[21] Appl. No.: 08/856,313

[22] Filed: May 14, 1997

[51] Int. Cl.[7] .................................... G06F 17/60
[52] U.S. Cl. ........................ 705/34; 705/30; 707/103
[58] Field of Search ...................... 705/1, 34, 40, 705/41, 30; 707/4, 101, 103

[56] References Cited

U.S. PATENT DOCUMENTS

| | | | |
|---|---|---|---|
| 4,918,593 | 4/1990 | Huber | 707/200 |
| 5,291,583 | 3/1994 | Bapat | 395/500 |
| 5,295,256 | 3/1994 | Bapat | 395/500 |
| 5,483,445 | 1/1996 | Pickering | 705/14 |
| 5,530,853 | 6/1996 | Schell et al. | 395/600 |
| 5,649,118 | 7/1997 | Carlisle et al. | 705/41 |
| 5,684,965 | 11/1997 | Pickering | 705/34 |

FOREIGN PATENT DOCUMENTS

| | | | |
|---|---|---|---|
| WO95/04960 | 2/1995 | WIPO . | |
| WO95/27255 | 10/1995 | WIPO | G06F 17/60 |
| WO96/34350 | 10/1996 | WIPO | G06F 17/30 |
| WO97/03406 | 1/1997 | WIPO | G06F 17/30 |
| WO98/52131 | 11/1998 | WIPO | G06F 17/30 |

OTHER PUBLICATIONS

Chenho Kung, "Object Subclass Hierarchy in SQL: A Simple Approach," Jul. 1990, Communications of the ACM, vol. 33, No. 7.

*Primary Examiner*—Allen R. MacDonald
*Assistant Examiner*—Hani M. Kazimi
*Attorney, Agent, or Firm*—Ritter, Van Pelt & Yi LLP

[57] ABSTRACT

Disclosed is a container object that allows a user to define new payment resources without requiring the user to redesign a relational database system used for persistent storage of transaction information. An object server maps data that is represented in transient memory according to an object-oriented scheme to data that is represented in persistent memory according to a relational database scheme. The object server generates appropriate tables and columns for a relational database scheme automatically so that the object-oriented scheme generated by a user may be efficiently stored and searched in persistent memory. Preferably, array elements are represented as rows in a table, not as columns so that storage space is not wasted with place holder data. In certain embodiments, a rating engine is provided that searches available rates and creates a rate stack for the purpose of authorizing transactions and adjusting payment source balances when authorization events or payment events occur.

17 Claims, 8 Drawing Sheets

Product_t

| PRODUCT ID | NAME | ATTRIBUTES |
|---|---|---|
| 6492 | PRODUCT A<br>PRODUCT B<br>PRODUCT C | |

702

RATE_t

| RATE ID | PRODUCT_ID | NAME | PRIORITY | DEFAULT FLAG | ATTRIBUTES |
|---|---|---|---|---|---|
| 1234 | 6492<br>6492<br>6492 | TYPE1<br>TYPE2 | | 1 | |

704

ACCT_t

| ACCT_ID | <ACCOUNT ATTRIBUTES> |
|---|---|
| | |

706

ACCT_BAL_t

| ACCOUNT ID | ELEMENT ID | CURR BAL | CREDIT LIMIT |
|---|---|---|---|
| | | | |

708

ACCT_PROD_t

| ACCOUNT ID | ELEMENT ID | PRODUCT ID |
|---|---|---|
| | | |

710

RATE_BAL_IMPACT_t

| RATE ID | ELEMENT ID | BAL_ELEMENT | FIXED OPERAND | FREE QUANTITY | TYPE |
|---|---|---|---|---|---|
| 1234<br>1234<br>1234 | 1<br>2<br>3 | 840<br>1004<br>840 | | | |

METHOD AND APPARATUS FOR TRACKING MULTIPLE PAYMENT RESOURCES AND CHARGING TRANSACTIONS TO PAYMENT RESOURCES IN ON LINE TRANSACTION PROCESSING SYSTEM

BACKGROUND OF THE INVENTION

1. Field of the Invention

The present invention relates generally to methods and apparatuses for tracking multiple payment resources and charging transactions to multiple payment resources according to a flexible rating engine in an on line transaction processing system More specifically, the invention relates in certain embodiments to methods and apparatuses for debiting and crediting existing payment resources or creating new payment resources using an object oriented scheme. Data relating to payment resources is transferred to and from an object server using a container object. The object server interacts with both a transient storage that is organized according to an object-oriented scheme and a persistent storage that is organized according to a relational database management scheme. The relational database in persistent storage is designed by the object server. This includes defining the tables of the relational database as well as the various columns. The object server then stores and retrieves data from the various tables defined in persistent storage according to a hierarchical tree that maps data encapsulated within objects to table locations in the relational database found in persistent storage.

When an event occurs that requires payment from a payment source, or when authorization is sought for an event that will require payment from a payment source, a rating engine analyzes a number of rates that are available, resources that are available, and available credit limits to create a rate stack that determines authorization and charging for a transaction.

2. Description of the Related Art

Billing has become increasingly complex in the field of on line transaction processing. In particular, convergent billing, where multiple services are billed to a customer on a single bill has become an important goal of on line transaction processing systems. In such systems, multiple sources of payment may be used to pay for services. For example, a phone company may provide both long distance phone service and internet access and may also handle billing for a certain on line services accessed by a customer. As the customer accesses one service, it may be desired to give the customer free time on one of the other services as an incentive to use both services. Additionally, it may be desired to give the customer some other sort of incentive such as frequent flier miles whenever the customer accesses a certain service. Payment for a given service may then be made from any one of these multiple resources, which must be tracked.

The problem becomes more complex when an authorization event or a payment event occurs. Different payment rates from different sources must be analyzed to determine the rate to be applied. In the case of an authorization, different credit limits applying to different sources must be checked.

One of the most important requirements of such a transaction processing system is the need to add payment resources and rate schemes without extensive reprogramming. Traditional payment systems have not been successful in meeting this requirement. The need for fast, optimized searching of a very large database has militated in favor of relational data base designs for the storage of customer, payment source, and rate information. Relational databases are built from a set of tables that contain related columns. The tables are indexed in an efficient manner by the relational database so that searches may be performed in an optimal manner. While organizing information into a complex related set of tables helps speed searching, a thorough knowledge of the tables is required to specify data that is to be retrieved or to specify where data is to be stored. Creating new data and creating new types of data such as new payment resources generally requires modifying the design of the tables to accommodate the new data and often requires extensive rewriting of existing the system program code. This means that a high level of expertise and familiarity with the database design is required to add payment resources.

Another problem in many relational database management systems (RDBMS's) is that columns in tables that contain no information or are not used nevertheless take up space in memory. Thus, when new payment resources are created, a large amount of memory may be allocated for tracking the payment source for every customer. Old payment resources that are no longer used also may continue to take up storage space until the database is restructured to remove them.

A standard relational query language, Structured Query Language (SQL) is used to query most popular relational databases. SQL requires that the person who specifies a query know what tables and columns contain the information that is to be compared against the query. For example, in order to look for all customers in a city, the user must know both the name of the table that contains city information and also the name of the column in that table that contains the city information. It is also necessary that the user know the tables that should be joined to accomplish the search and how to join those tables. Likewise, in order to store information in the proper column of the proper table, the user must know the name of the table and column in which the information should be stored.

In contrast, it is easier to query, modify and write information to object-oriented databases. Instead of specifying a table and column for storing or retrieving information, related data is encapsulated in an object. The object may be read into memory and all encapsulated data may be readily accessed. Searching, however, is not as efficient as relational database searching. It would be desirable if an object oriented database could be used to add payment resources and rates and to retrieve information into a transient memory, and if a relational database could be used for persistent storage of data.

In view of the foregoing, there is a need for methods and apparatuses for defining payment resources using an object-oriented database associated with a transient memory and creating a relational data base in persistent memory that stores payment source information. It would also be useful if an efficient system for charging payments at different rates could be developed.

SUMMARY OF THE INVENTION

Accordingly, the present invention provides a container object that allows a user to define new payment resources without requiring the user to redesign a relational database system used for persistent storage of transaction information. An object server maps data that is represented in transient memory according to an object-oriented scheme to data that is represented in persistent memory according to a relational database scheme. The object server generates appropriate tables and columns for a relational database scheme automatically so that the object-oriented scheme generated by a user may be efficiently stored and searched in persistent memory. Preferably, array elements are represented as rows in a table, not as columns so that storage space is not wasted with place holder data. In certain embodiments, a rating engine is provided that searches available rates and creates a rate stack for the purpose of authorizing transactions and adjusting payment source balances when authorization events or payment events occur.

It should be appreciated that the present invention can be implemented in numerous ways, including as a process, an apparatus, a system, a device, a method, or a computer readable medium. Several inventive embodiments of the present invention are described below.

In one embodiment, a method of assigning payment resources to an account balance stored in an RDBMS table includes instantiating a balance adjusting container object that includes an account element identification number, a balance element identification number of a balance element that will be adjusted and an adjusting amount and formulating an RDBMS query to determine whether an entry in an account balance table exists that corresponds to the account element identification number and the balance element identification number. If an entry in the account balance table is found, the found entry in the account balance table is adjusted by the adjusting amount. If no entry in the account balance table is found, then an entry is created in the account balance table with a default balance and the created entry is incremented by the adjusting amount.

In another embodiment, a method of defining a payment resource for inclusion in a real time transaction processing system includes instantiating a balance element creating container object and including data fields in the balance element creating container object including a balance element identification number field and providing a balance element identification number in the balance element identification number field. A new row is added to a payment resources RDBMS table using the information from the balance element creating container object.

In another embodiment a method of determining a rate for adjusting a real time balance includes receiving a billing event, the billing event including a rate name, a quantity used, an attribute that describes the event, and an account to be billed. A product table is searched to determine all of the products in the account to be billed and a rate table is searched to determine all of the rates that correspond to the rate name and the products in the account to be billed. Rates are eliminated that do not match the attribute that describes the event and the remaining rates are ordered by descending priority to obtain a rate stack For each rate in descending order of priority, the maximum portion of the quantity used that can be applied using the rate without violating a credit limit is allocated.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 7 is a block diagram illustrating relational database tables used to implement the rating method used in one embodiment of the present invention.

DETAILED DESCRIPTION OF THE PREFERRED EMBODIMENTS

Reference will now be made in detail to the preferred embodiments of the invention. An example of a preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims along with their full scope of equivalents. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
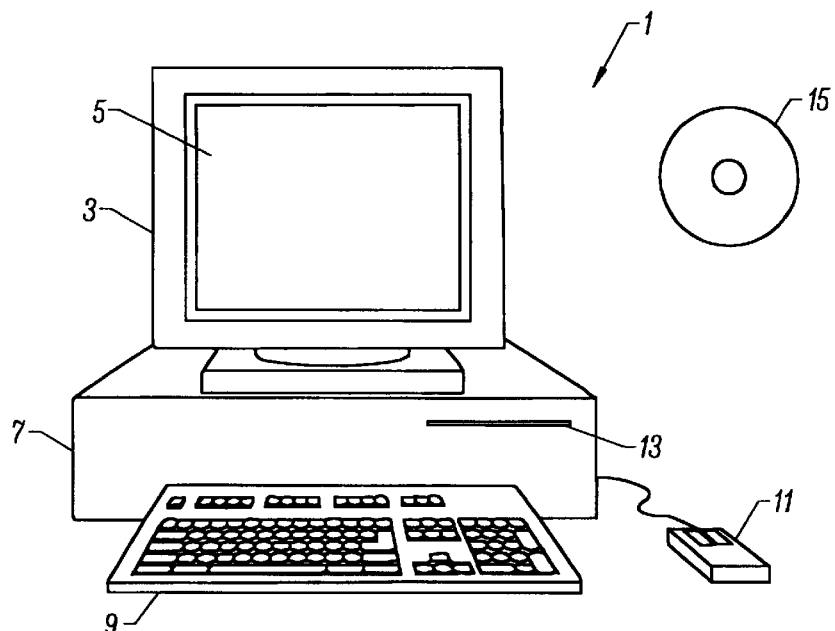
FIG. 1 illustrates an example of a computer system that may be used to execute the software of an embodiment of the present invention.

FIG. 1 illustrates an example of a computer system that may be used to execute the software of an embodiment of the present invention. FIG. 1 shows a computer system 1 which includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the present invention, data for use with the present invention, and the like. Although the CD-ROM 15 is shown as an exemplary computer readable storage medium, other computer readable storage media including floppy disks, tape, flash memory, system memory, and hard drives may be utilized.

Figure 2:
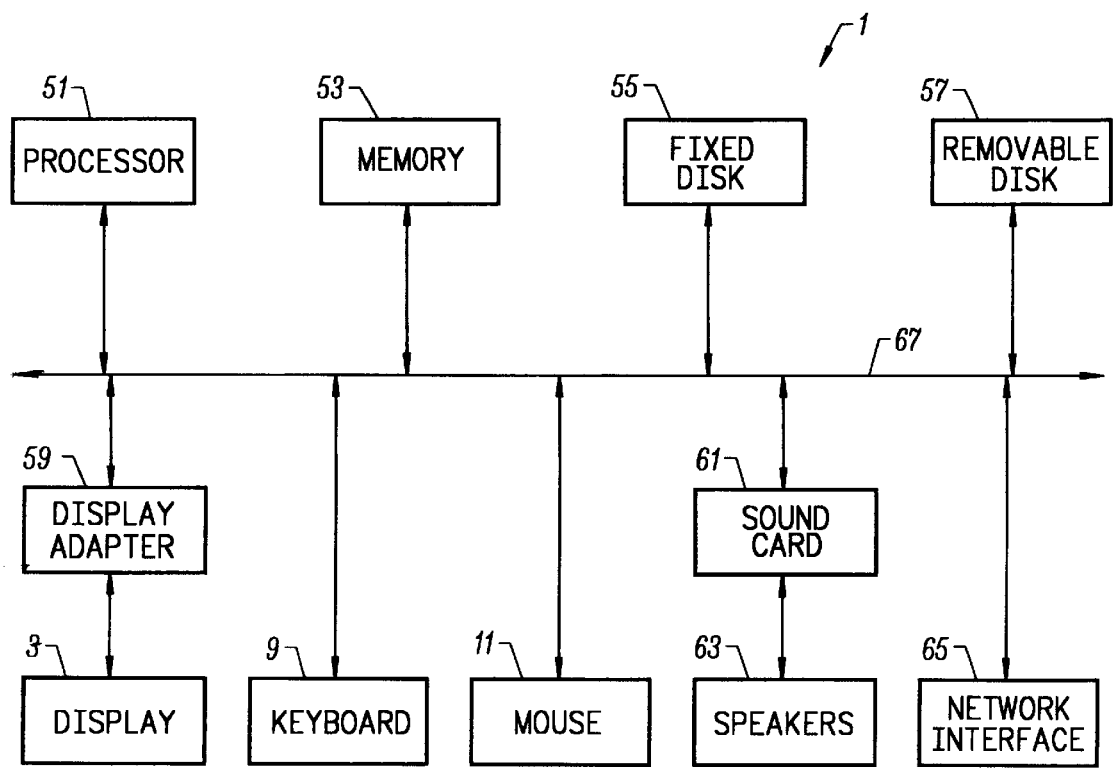
FIG. 2 shows a system block diagram of computer system used to execute the software of an embodiment of the present invention.

FIG. 2 shows a system block diagram of computer system 1 used to execute the software of an embodiment of the present invention. As in FIG. 1, computer system 1 includes monitor 3 and keyboard 9, and mouse 11. Computer system 1 further includes subsystems such as a central processor 51, system memory 53, fixed disk 55 (e.g., hard drive), removable disk 57 (e.g., CD-ROM drive), display adapter 59, sound card 61, speakers 63, and network interface 65. Other computer systems suitable for use with the present invention may include additional or fewer subsystems. For example, another computer system could include more than one processor 51 (i.e., a multi-processor system), or a cache memory.

Arrows such as 67 represent the system bus architecture of computer system 1. However, these arrows are illustrative of any interconnection scheme serving to link the subsystems. For example, a local bus could be utilized to connect the central processor to the system memory and the display adapter. Computer system 1 shown in FIG. 2 is but an example of a computer system suitable for use with the present invention. Other configurations of subsystems suitable for use with the present invention will be readily apparent to one of ordinary skill in the art.

A system for transferring data to and from a transient memory that is organized according to an object-oriented scheme to a persistent memory that is organized according to a relational database management scheme is disclosed in U.S. Patent Application Attorney Docket No. PORTP001 filed May 14, 1997, which is herein incorporated by reference for all purposes. Additionally, a system for providing a clean accounting close for a real time billing system is disclosed in U.S. Patent Application Attorney Docket No. PORTP003 filed May 14, 1997, which is herein incorporated by reference for all purposes. As is shown below, a transaction processing system using this architecture can readily add and configure payment resources and create rating schemes.

Figure 3:
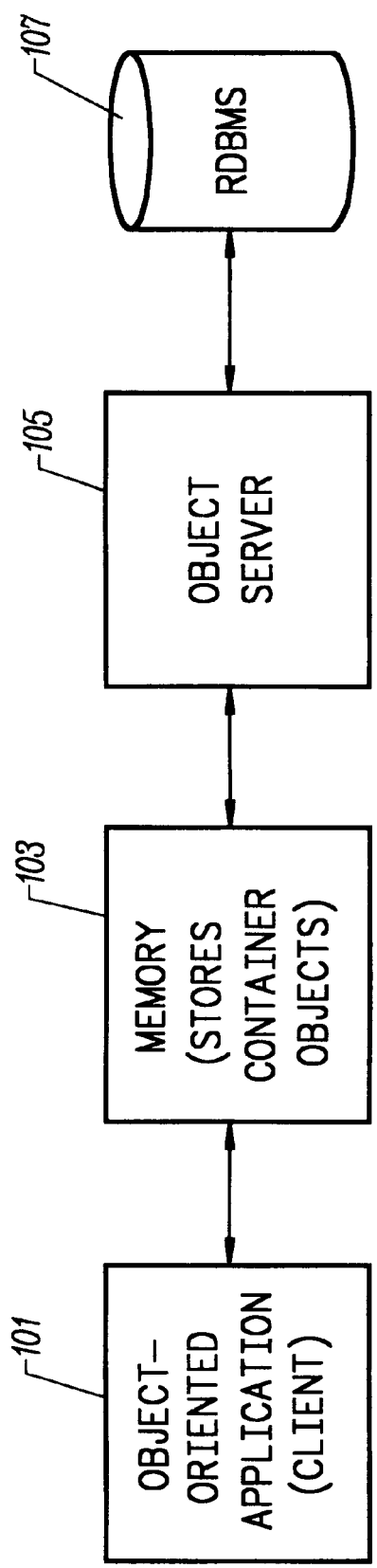
FIG. 3 is a block diagram illustrating a system architecture for an object-oriented application that stores objects in a relational database.

FIG. 3 is a block diagram illustrating a system architecture for an object-oriented application that stores objects in a relational database. An object-oriented application 101 allows object-oriented creation, manipulation, and searching of objects. In traditional client-server nomenclature, application 101 is the client and it typically operates on a computer system. The computer system may be similar to the one shown in FIG. 1.

As objects are created or accessed by application 101, the objects are stored in memory 103. The memory may be generally thought of as transient storage—meaning that the storage is only temporary and is not the permanent storage of the objects. Typically, memory 103 is the dynamic random access memory of the computer system on which the client computer system operates. Of course, memory 103 is not limited to any specific memory-type as it may be cache memory, flash memory, hard drive, floppy disk, and the like.

An object server 105 provides the interface between the object-oriented scheme and the relational database scheme. The object server is a process that translates object-oriented requests into relational database requests (e.g., SQL). Typically the object server operates on the same computer system as the object-oriented application. However, there is no requirement that the object server operate on the same computer system or at the same location (e.g., the two computer systems may be in communication over a network).

The object server sends relational database requests to a relational database management system (RDBMS) 107. The RDBMS stores data in relational tables with columns in the tables representing data of the same type. The RDBMS typically operates on a different computer system than the object server. In traditional client-server nomenclature, RDBMS 107 is the server. In a preferred embodiment, the RDBMS is from Oracle Corporation, Redwood Shores, Calif.

The object-oriented environment shields the user from the relational database implementation used for persistent storage. This is in stark contrast to traditional relational database applications where it is generally required for a user to know how data is stored in order to formulate queries on the data or create new data fields.

Figure 4A:
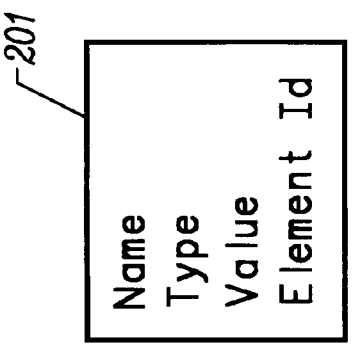
FIG. 4A is an illustration of a data block.
Figure 4B:
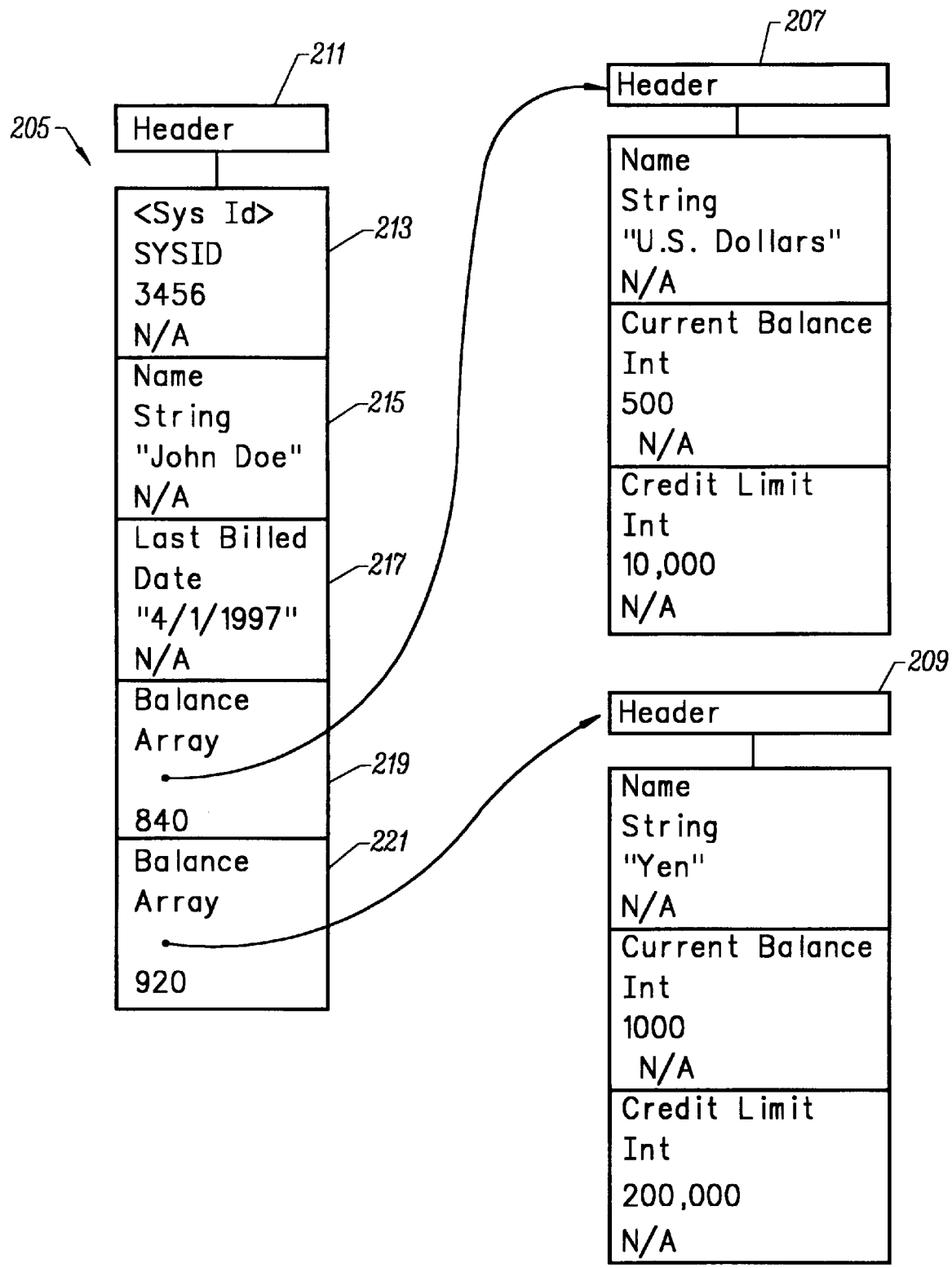
FIG. 4B is an illustration of a container object which stores an account object.

As is described in detail in U.S. Patent Application Attorney Docket No. PORTP001, information is transferred by a user to and from the object server using container objects. Each object within a container object includes a number of data blocks. FIG. 4A is an illustration of a data block 201 Data block 201 includes four fields for storing the following information:

Name—indicates the name of the data in the data block
Type—indicates the data type of the data in the data block
Value—stores the value of the data in the data block
Element Id—indicates the id of an element of an array FIG. 4B is an illustration of a container object 203 which stores an account object. The account balances for each payment source are represented as a balance array, as is further described below. The container object includes a main container 205. Main container 205 includes a header 211 which stores information about the main container (e.g., number of subsequent data blocks and memory location). Following the header, there are one or more data blocks that provide account information.

Referring to a data block 213, the Name of the data block is <Sys Id> indicating that this data block stores a system id for the object, which may be thought of as the name of the object from the system's point of view. In a preferred embodiment, the Sys Id includes a type string, id number, database number, and revision number.

In data block 213, the Type is "Sys Id" indicating that this data block identifies an object. The Value of the data block stores 3456 which is a number which will be utilized to join relational tables storing data members for this object. Accordingly, this number will be referred to as the "Id" when discussing the relational database tables storing the object. Lastly, the Element Id is "N/A" (not applicable) as this data block does not store an element of an array. Thus, it should not matter what is stored in the Element Id field.

A data block 215 stores a data member of the object. The Name field contains "Name" which is the name of the first data member of the class. The Type of the data block is "String" which indicates the Value field stores a string which is shown as "John Doe." As the data block does not store an element of an array, the Element Id field is not applicable.

A data block 217 stores another data member of the object The Name field contains "Last Billed" which is the name of the second data member of the class. The Type of the data block is "Date" which indicates the Value field stores a date which is shown as a string for Apr. 1, 1997. As the data block does not store an element of an array, the Element Id field is not applicable.

A data block 219 stores an element of the array "Balance" utilizing subcontainer 207. The Name field contains "Balance" which is an array because the type field of the data block indicates that it is an array. The balance array is used to keep track of each different type of payment source for the account. Instead of containing an actual value or set of values as would normally be the case for an array, the value field contains a memory pointer to a subcontainer 207 which stores the data for the element of the array balance that is represented by data block 219. The Element Id field contains the number 840. In this example, 840 functions in two ways. First, 840 is the array index. Thus the array element balance (840) is distinguished from and array element balance (920). 840 also happens, according to the International Standards Organization (ISO), to specify U.S. dollars. The Element Id field is used to join relational tables storing data members for this object.

This special relationship of arrays to memory is significantly different from the way arrays are generally stored in memory. Generally, all of the elements of an array are assigned locations in memory and the index of the array points to the specific memory location that is assigned to the element of the array that corresponds to the index. If certain elements of the array contain no data, then those memory locations are reserved, but blank. This can result in a very large amount of memory being allocated or reserved in order to add a single element to an array.

This can be clearly seen in the present example, where every account has a balance array. In a typical on line transaction processing system, there may be millions of accounts. Additionally, each balance array as shown is actually an array of structures. For every balance element, there exists a current balance, and a credit limit. Without the structure shown in FIG. 4B, adding a new payment source, and therefore a new balance element, would be extremely expensive from a memory standpoint. Each balance structure (of which there is one for every account) would have to have the additional fields added to it, at great cost in memory.

In contrast, the scheme shown in FIG. 4B provides a flexible or "lazy" allocation of memory to elements in the array. For each account, only those array elements that represent payment resources included within that account are ever assigned memory. Each balance array element is included in the account container as a data block and the value of the data block points to a memory location of a container that includes the name, current balance, and credit limit for the balance array element. The amount of allocated memory that is saved is large, especially if a large number of accounts exist and certain balance elements are shared by a relatively small number of account holders, and/or if a large number of payment resources exist.

Subcontainer 207 contains two data blocks which indicate that balance array element 840 for the account in container 205 has a Current Balance of 500 U.S. Dollars and a Credit Limit of 10,000 U.S. Dollars. The name of the currency of the two data blocks is indicated by the array element index, which is also called the balance element ID. Other non-standard indices may be used to track resources such as frequent flier miles. A data block 221 stores another element of the array "Balance" utilizing subcontainer 209.

Putting the container object shown in FIG. 4B into perspective, the container object is typically stored in memory 103 shown in FIG. 3. Therefore, the container objects are the method of communicating data (along with API calls) between the object-oriented application and the object server. As is described in detail in U.S. Patent Application Attorney Docket No. PORTP001 filed May 14, 1997, an hierarchical list is used to map the data included in data objects placed in containers to the various fields of a relational database. Now it may be beneficial to describe the way that payment resources are stored in the relational database as related tables.

Figure 4C:
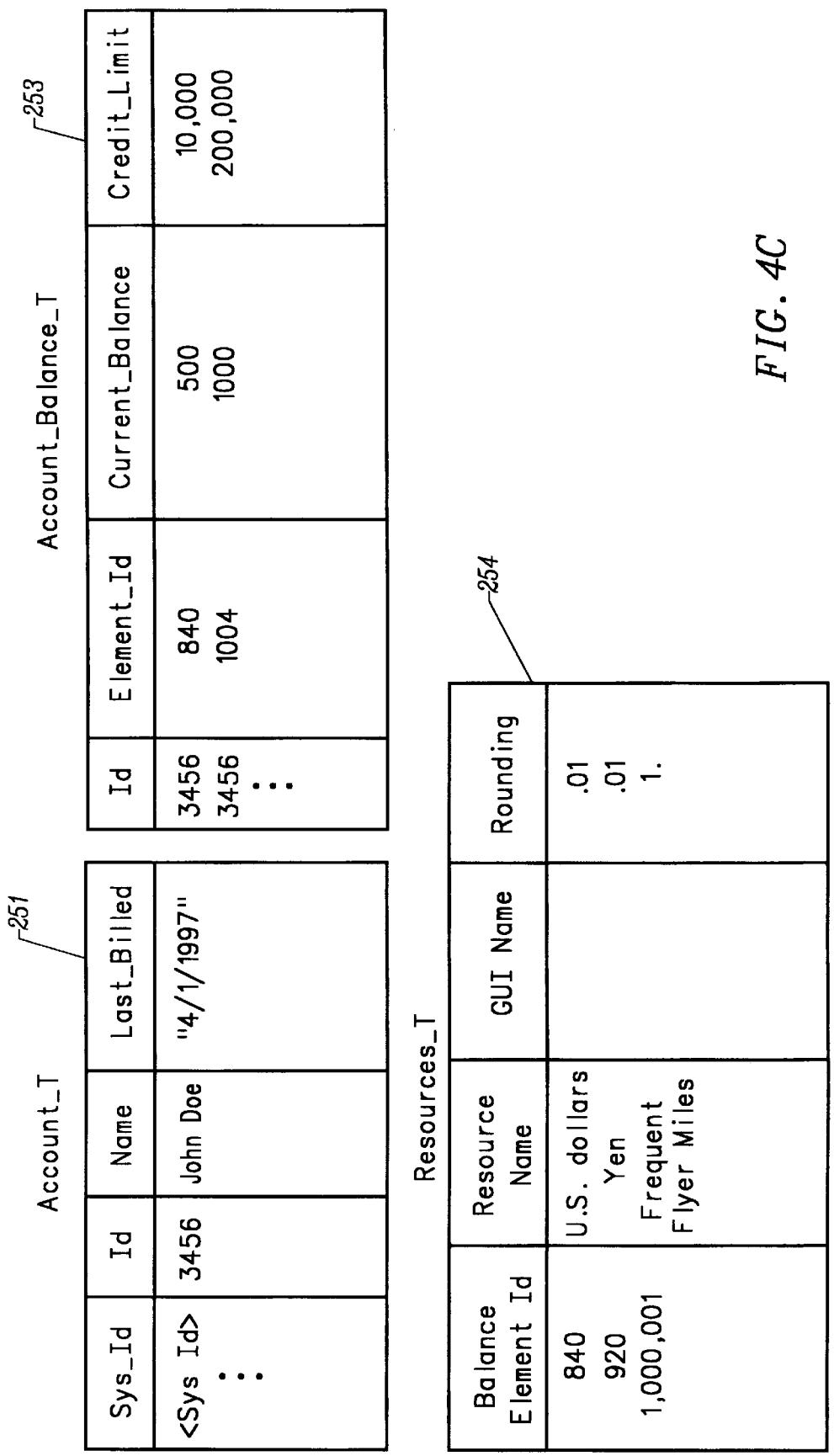
FIG. 4C illustrates relational database tables that may be generated by the object server to store objects.

FIG. 4C illustrates relational database tables that may be generated by the object server to store objects. A relational database table (Account_T) 251 is the main relational table for the objects. As shown, the table includes columns entitled "Sys_Id," "Id," "Name" and "Last_Billed." The Sys_Id refers to an identification of the object given by the system. The Id refers to a number that will be utilized to identify this object in the relational database and therefore, join relational database tables. The Name and Last_Billed columns store data members of the object.

A relational database table (Account_Balance_T) 253 stores elements of the array "Balance." As shown, the table includes a column entitled "Id" which stores the id of the account object for which the data in this table belongs. As one familiar with relational databases will recognize, the Id will be utilized to join relational database tables 251 and 253. The Id may also be utilized to join relational database table 253 with other relational database tables that are included in the database, such as an account system. Table 253 also includes a column entitled "Element_Id" which designates the element id of this element. In the instant case, the element Id indicates which element of the balance element array is stored in the row and also designates the currency of the data in the balance element. Lastly, table 253 includes columns entitled "Current_Balance" and "Credit_Limit" which are the data members of each element of the array Balance in this example.

It should be readily apparent that by storing data members of objects in relational database tables, it is possible to use conventional relational database management systems to query the relational database tables. Thus, the benefits of relational database system searching are enjoyed while the object oriented interface simplifies adding payment resources and adjusting payment source balances.

A relational database table (Resources_T) 254 keeps track of the various payment resources that have been defined for the system. As shown, the table includes a column for each balance element ID. The resource name for each balance element is also included in a separate column, as is a graphical user interface (GUI) name. The GUI name is used in systems where special GUI information is provided to the user in certain circumstances. Another column defines the rounding characteristics for each balance element.

Adding a new type of payment source to the system involves adding a new array element to the balance element array. This is accomplished in memory by adding a row to table 254. Adding an existing payment source to an account object involves adding a new row to table 253. The processes for adding a new type of payment source and for adding an existing payment source to an account object are described in further detain in FIGS. 5 and 6. An important feature of the memory system described above is that memory is not allocated to arrays such as the balance element array until it is needed. This is the so-called "lazy" allocation" of memory.

Figure 5:
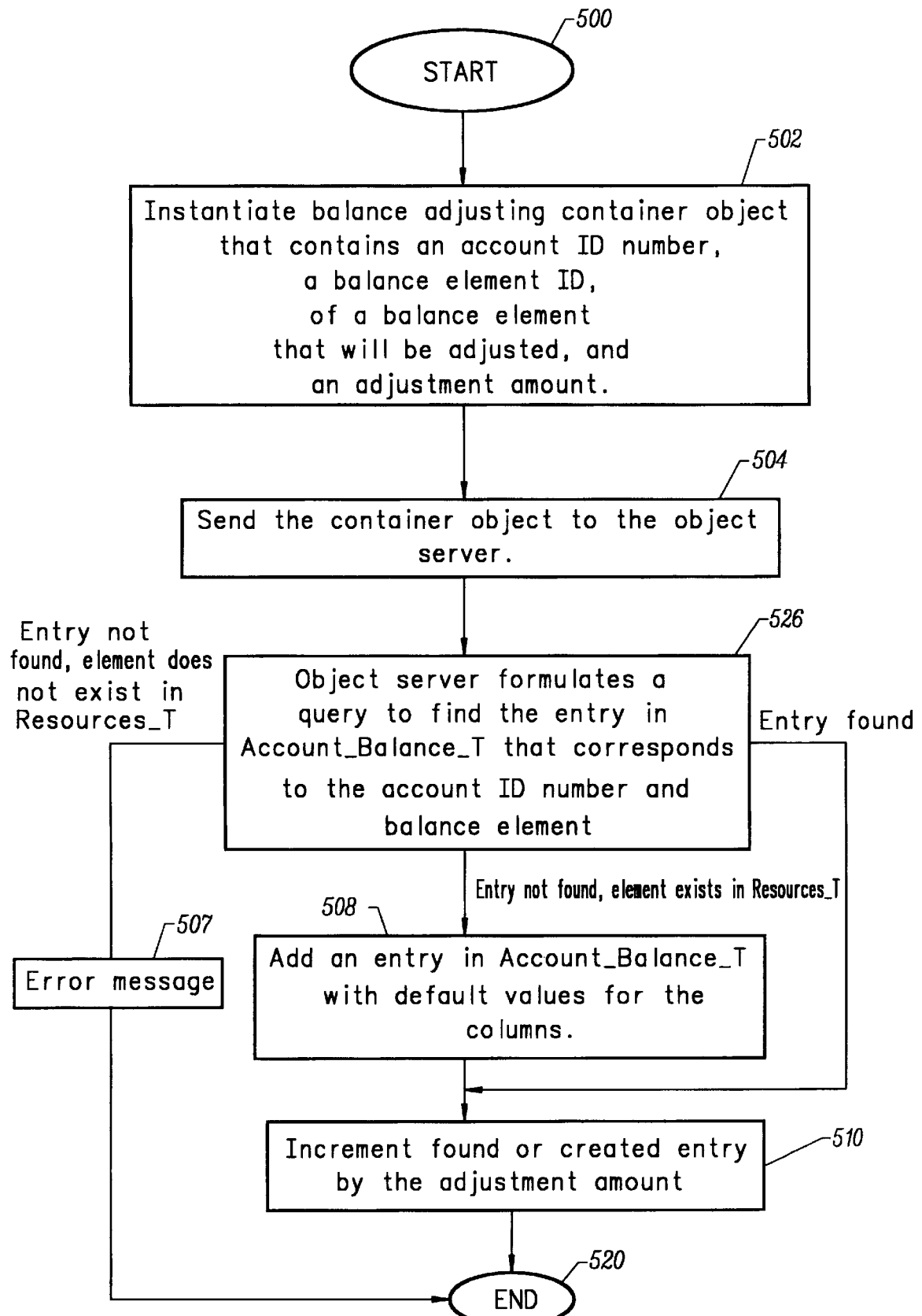
FIG. 5 is a process flow diagram illustrating a process for adding a new payment source or balance element to an account.

FIG. 5 is a process flow diagram illustrating a process for adding a new payment source or balance element to an account. The process starts at 500. In a step 502, a balance adjusting container object is instantiated that contains an account ID number, and one or more balance element ID's of the balance element that is to be adjusted, and an adjustment amount for one or more balances. (Note that a single balance element, such as dollars may have several balances associated with it such as a credit balance and a credit limit.) Next, in a step 504, the container object is sent to the object server. In a step 506, the object server formulates a query to find the one or more entries in Account_Balance_T that corresponds to the account ID number and balance element specified in the balance adjusting container object. If an entry is not found, then the object server formulates a query for the table Resources_T to see if the balance element exists in Resources_T. If the balance element does not exist in Resources_T, then it is undefined system wide and so an error message is sent in a step 507 and then the process ends at 520. If the balance element exists in Resources_T, then control is transferred to a step 508 and a row is added in Account_Balances_T with default values in the columns and control is transferred to a step 510 where the newly created entry balances are incremented by the amounts specified in the balance adjusting container object. If an entry is found in Account_Balance_T in step 506, then control is transferred directly to step 510 and the found entry balances are incremented by the amount specified in the balance adjusting container object, which may be either a positive or a negative number Once step 510 is completed, the process ends at 520.

The process described in FIG. 5 is considerably simplified from the standpoint of the application in that it works whether or not a particular balance exists for an account. If the balance does not exist, it is simply added with a default value of zero and then is incremented in step 510.

Figure 6:
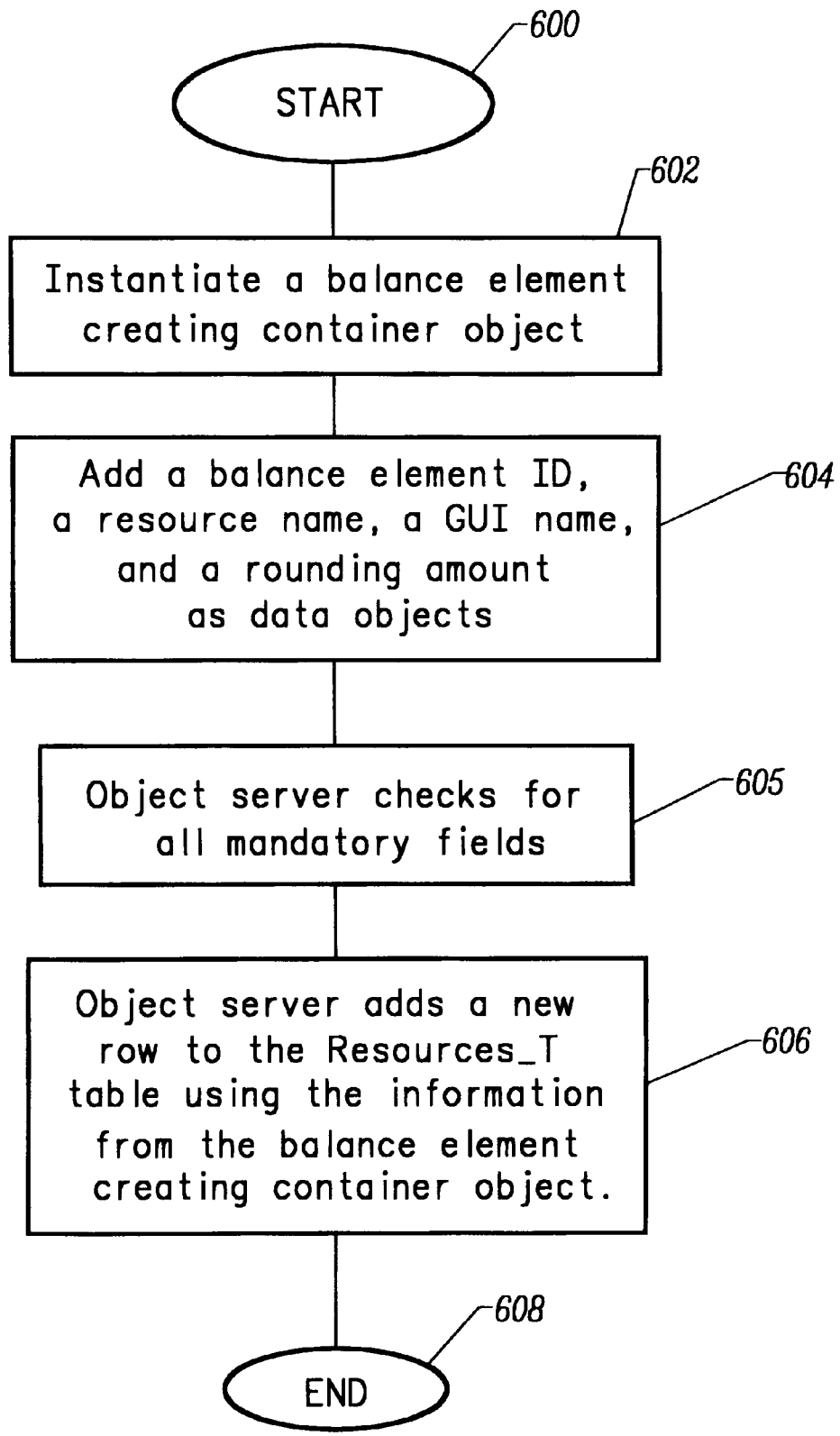
FIG. 6 is a process flow diagram illustrating a process for adding a new balance element type to the on line transaction processing system.

FIG. 6 is a process flow diagram illustrating a process for adding a new balance element type to the on line transaction processing system. The process starts at 600. In a step 602, a balance element type creating container is instantiated. In a step 604, A balance element ID, a resource name, a GUI name, and a rounding amount are added to the balance element type creating container as data objects. In a step 605, the object server checks to make sure that all of the fields required to add a new balance element type are in the container. If not, then an error message is generated. In a step 606, the object server then adds a new row to the Resources_T table using the information from the balance element type creating container object. The process ends at 608.

Thus, adding a new type of payment source to the system is done by instantiating a balance element type creating container object and providing the necessary information in data blocks contained in the balance element type creating container object. Adding a new type of payment source to an account is accomplished by instantiating a balance adjusting container object. and providing the necessary information in the data blocks contained in the balance adjusting container object.

So far, a system and method for defining payment resources and assigning payment resources (which will now be referred to as "resources") to accounts has been described. Now, a system and method for increasing and decreasing the balances of different payment resources defined for an account according to a flexible rating method will be discussed.

The following definitions apply to the rating method described below:

Product—A product is an asset that is bought by a customer that may influence or determine amount of resources that the customer will be charged for consuming certain rated quantities. An example of a product would be a certain calling plan that entitles the user to pay 1.00 per hour for a certain rated quantity. Another product could be a plan that entitles the user to pay 2.00 per hour for the same rated quantity.

Rate—A rate is something that determines the cost of a quantity, that is a rate determines how a quantity will impact customer balances when it is consumed. For example, a rate used by an internet service provider may be "type A connect time". The rate determines the cost of a quantity of hours or other consumable according to its impact on various balances.

FIG. 7 is a block diagram illustrating relational database tables used to implement the rating method used in one embodiment of the present invention. A Product_t table 702 contains a list of each product that is available. Product_t table 702 includes Product ID column that identifies the product, a Name column that provides the name of the product, and a number of attribute columns that may describe things about the product such as when the product may be purchased or the type of customer who is eligible to purchase the product.

A Rate_t table 704 contains a list of all of the rates that may be charged for a quantity. A Rate_t table 704 includes a Rate ID column that identifies the rate, a product ID column that identifies the product associated with the rate, and a rate name column that gives the name of the rate. It should be noted that rate names are generally not unique. The same rate name may be repeated for many rate ID's. Rate_t table 704 also includes a priority column that indicates the priority of each rate, a default flag column that indicates whether each rate is eligible as a default rate, and an attribute column that indicates such attributes of the rate such the time of day when it is applicable.

An ACCT_t table 706 contains a list of the accounts. ACCT_t table 706 includes an Account ID column that identifies the account and various account attributes such as the customer name and when the customer was last billed.

An ACCT_BAL_t table 708 contains a list of all account balance elements that are contained in the various accounts. ACCT_BAL_t table 708 includes an Account ID column that identifies the account, a Balance Element ID column that identifies the balance element type, a current balance column and a credit limit column.

An ACCT_PROD_t table 710 contains a list of all of the products that are contained in the various accounts. An ACCT_PROD_t table 710 contains an Account ID column that identifies the account, An element ID column that provides an index for the ACCT_PROD_t table, and a Product ID column that identifies the product that is included in the account identified by the Account ID.

A RATE_BAL_IMPACT_t table 712 contains a list that describes the way that each rate will impact the various balances that are in an account. RATE_BAL_IMPACT_t table 712 includes a rate ID column that identifies the rate, an Element ID column that provides an index for the RATE_BAL_IMPACT_t table, a Balance Element ID column that determines the balance element that is impacted, a fixed operand column that determines a minimum amount of the balance that is charged, a scaled operand column that determines the rate that the balance is charged after a free quantity, a free quantity column that determines the quantity that is provided for the fixed operand amount, and a type column that is used to describe the type of charge that is made (e.g. a debit, credit, or rebate.)

In one embodiment, the fixed operand, scaled operand, and free quantity are used according to the following cost formula:

$$cost = \text{fixed operand} + \text{scaled operand} * (\text{quantity} - \text{free quantity}).$$

It should be noted that in other embodiments, other formulas are used and other columns are provided in the RATE_BAL_IMPACT_t table to provide the operands required. It should also be generally noted that the columns in the tables shown are not intended to be all of the columns in each table, and shown for the purpose of illustrating the present example.

Figure 8:
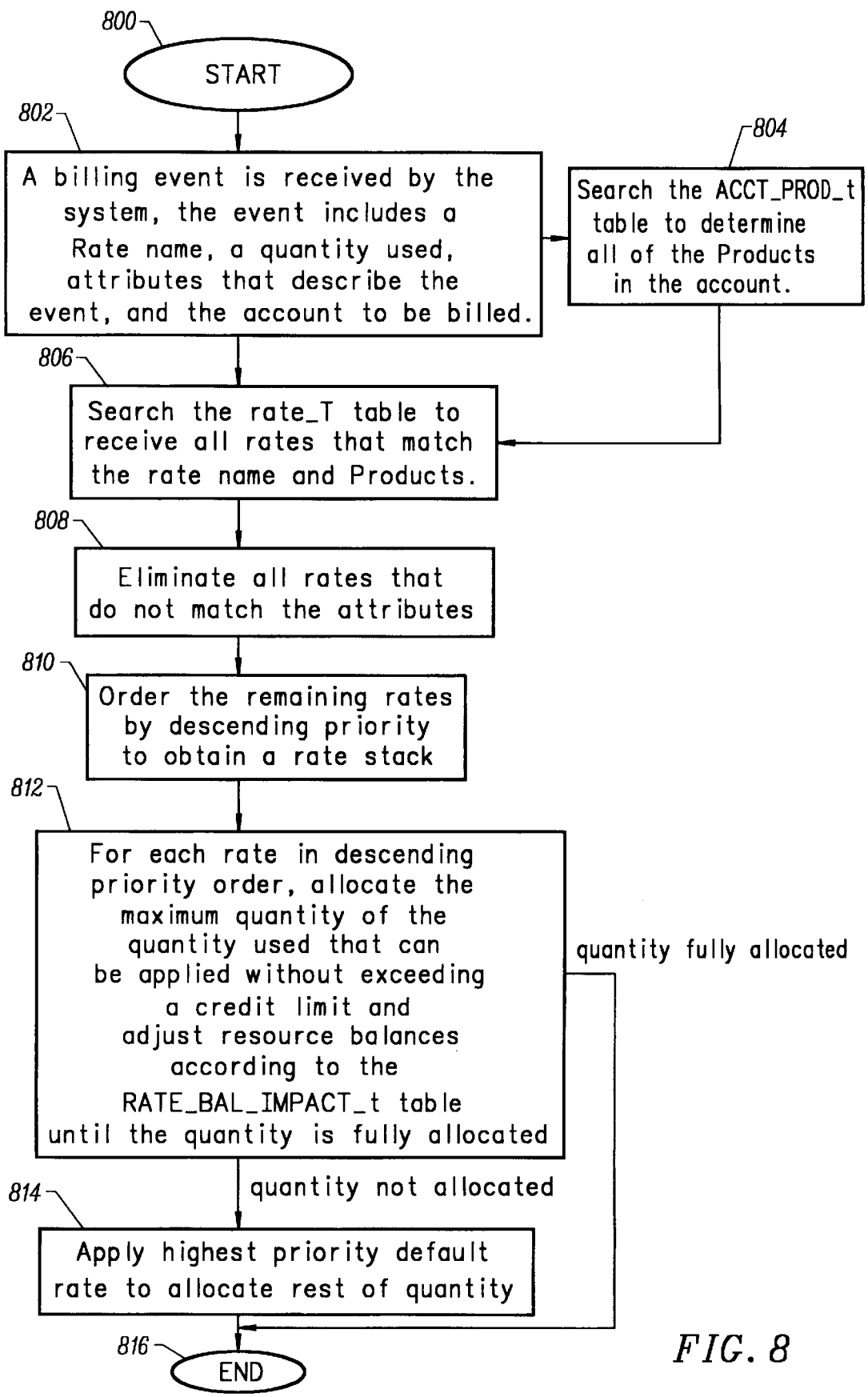
FIG. 8 is a process flow diagram illustrating the process that runs when a billing event occurs for an account.

FIG. 8 is a process flow diagram illustrating the process that runs when a billing event occurs for an account. The process starts at 800. In a step 802, a billing event is received by the system. The event includes a rate name, a quantity used, attributes that describe the event, and the account that is to be billed. Next, in a step 804, the ACCOUNT_PROD_t is searched to determine all of the products that are owned by the account. In a step 806, the RATE_t table is searched to retrieve all of the rates that match the rate name and the found products for the account. Thus, only rates that have a rate name that corresponds to the rate name of the event and that are associated with a product that is owned in the account are retrieved.

In a step 808, all rates that do not have attributes that match the attributes of the billing event are discarded. What is left is a list of usable rates. The usable rates are then ordered by descending priority to obtain a rate stack in a step 810. Next, in a step 812, the quantity billed is allocated to each rate in order of priority and the applicable resources are adjusted according to the cost that is derived from the RATE_BAL_IMPACT_t table as described above. Each rate is allocated the maximum quantity that can be applies without exceeding a credit limit. If all of the rates are exhausted before the entire quantity billed is allocated, then control is transferred to a step 814 and highest priority rate in the stack that has a default flag that indicates that the rate is an eligible default rate is used to allocate the remainder of the quantity. The process then ends at 816. If the entire quantity billed is allocated in step 814, the process ends at 816 directly.

The above described process, combined with the tables shown in FIG. 7 provides an extremely adaptable rating and billing system. In particular, the RATE_BAL_IMPACT_t table enables a single rate to impact multiple resources or even the same resource independently. For example, if the billing event is one hour of Type A connect time, then the customer can be charged hours, dollars, or any other resource, and can also be given free time, frequent flier miles or any other resource. In fact the customer could be billed dollars and rebated dollars. The cost formula shown above also allows the user to be billed a flat fee, an hourly rate, or some combination of a flat fee. Different rate brackets (similar to income tax brackets) applicable to different quantities can also be defined. Rates are prioritized and charged according to available credit limits and a default rate is applied when to available rate can be charged without violating a credit limit. When a credit limit is exceeded, service can be denied or a message sent.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer implemented method of adjusting an account balance stored in an RDBMS table comprising:

instantiating a balance adjusting container object that includes an account element identification number, a balance element identification number of a balance element that will be adjusted and an adjusting amount, the account element identification number and balance element identification number identifying the account balance;

formulating an RDBMS query to determine whether an entry in an account balance table exists that corresponds to the account element identification number and the balance element identification number;

if an entry in the account balance table is found, then adjusting an account balance in the found entry in the account balance table by the adjusting amount; and if no entry in the account balance table is found, then creating an entry in the account balance table with a default account balance and adjusting the account balance in the created entry by the adjusting amount;

wherein the account balance table is not required to include entries for account balances that have not been adjusted.

2. A method as recited in claim 1 wherein the default account balance is zero.

3. A method as recited in claim 1 wherein the RDBMS query is an SQL query.

4. A method as recited in claim 1 further including sending the balance adjusting container to an object server and wherein the object server formulates the RDBMS query.

5. A method as recited in claim 1 wherein the object server formulates the RDBMS query using an hierarchical tree.

6. A computer program product that adjusts an account balance stored in an RDBMS table comprising:

computer code that instantiates a balance adjusting container object that includes an account element identification number, a balance element identification number of a balance element that will be adjusted and an adjusting amount, the account element identification number and balance element identification number identifying the account balance;

computer code that formulates an RDBMS query to determine whether an entry in an account balance table exists that corresponds to the account element identification number and the balance element identification number;

computer code that adjusts an account balance in the found entry in the account balance table by the adjusting amount if an entry in the account balance table is found;

computer code that creates an entry in the account balance table with a default account balance and adjusts the account balance in the created entry by the adjusting amount if no entry in the account balance table is found, wherein the account balance table is not required to include entries for account balances that have not been adjusted; and a computer readable medium that stores the computer codes.

7. A computer program product as recited in claim 6 wherein the default account balance is zero.

8. A computer program product as recited in claim 6 wherein the RDBMS query is an SQL query.

9. A computer program product as recited in claim 6 further including computer code that sends the balance adjusting container to an object server and wherein the object server formulates the RDBMS query.

10. A computer program product as recited in claim 6 wherein the object server formulates the RDBMS query using an hierarchacal tree.

11. A computer program product as recited in claim 6 wherein the computer readable medium is a memory, floppy disk, hard disk, tape, flash memory, or system memory.

12. A system that adjusts an account balance stored in an RDBMS table comprising:

a processor; and a computer readable medium that stores a computer program comprising:

computer code that instantiates a balance adjusting container object that includes an account element identification number, a balance element identification number of a balance element that will be adjusted and an adjusting amount, the account element identification number and balance element identification number identifying the account balance;

computer code that formulates an RDBMS query to determine whether an entry in an account balance table exists that corresponds to the account element identification number and the balance element identification number;

computer code that adjusts an account balance in the found in the account balance table by the adjusting amount if an entry in the account balance table is found; and computer code that creates an entry in the account balance table with a default account balance and adjusts the account balance in the created entry by the adjusting amount if no entry in the account balance table is found, wherein the account balance is not required to include entries for account balances that have not been adjusted.

13. A system recited in claim 12 wherein the default account balance is zero.

14. A system as recited in claim 12 wherein the RDBMS query is an SQL query.

15. A system as recited in claim 12 further including computer code that sends the balance adjusting container to an object server and wherein the object server formulates the RDBMS query.

16. A system as recited in claim 12 wherein the object server formulates the RDBMS query using an hierarchical tree.

17. A system as recited in claim 12 wherein the computer readable medium is a memory, floppy disk, hard disk, tape, flash memory, or system memory.

\* \* \* \* \*